United States Patent [19]
Voigts

[11] Patent Number: 5,319,834
[45] Date of Patent: Jun. 14, 1994

[54] VERSATILE HEAVY DUTY TIRE BEAD PULLER

[76] Inventor: Ralph Voigts, 515 James St., Streator, Ill. 61364

[21] Appl. No.: 21,551

[22] Filed: Feb. 24, 1993

Related U.S. Application Data

[63] Continuation-in-part of Ser. No. 933,366, Aug. 24, 1992, abandoned.

[51] Int. Cl.⁵ .............................................. B23P 19/02
[52] U.S. Cl. .................................. 29/426.4; 29/244; 29/283; 29/403.3; 29/426.5; 225/2; 225/93; 241/DIG. 31
[58] Field of Search ............... 29/244, 252, 283, 403.3, 29/426.4, 426.5, 802; 157/13; 241/DIG. 31; 225/2, 88, 90, 93

[56] References Cited

U.S. PATENT DOCUMENTS

| | | | |
|---|---|---|---|
| 3,383,492 | 10/1974 | Uemura | 29/426.4 X |
| 3,803,693 | 4/1974 | Kolkhir et al. | 29/403.3 |
| 4,873,759 | 10/1989 | Burch | 29/426.4 X |

FOREIGN PATENT DOCUMENTS 139811  3/1960  U.S.S.R. ................ 29/403.3

Primary Examiner—Mark Rosenbaum
Assistant Examiner—S. Thomas Hughes
Attorney, Agent, or Firm—Low and Low

[57] ABSTRACT

A heavy duty bead remover for vehicle passenger and heavy duty tires wherein the bead is hooked at a circumferential point and drawn through a narrow transversely slotted aperture, thereby to tear the bead from the tire and pull it through the aperture. Adjustable pressure jaws are provided to clamp the bead to the hook, and further a curved guide adjacent the slotted aperture is provided to reduce draw and tear forces. The tire is preferably specially cut prior to tear removal of the bead.

18 Claims, 2 Drawing Sheets

VERSATILE HEAVY DUTY TIRE BEAD PULLER

Cross-Reference to Related Application

This application is a continuation-in-part of my prior application Ser. No. 07/933,366, filed Aug. 24, 1992, now abandoned.

BACKGROUND OF THE INVENTION

It is well known that environmental as well as sound conservation necessities dictate the salvage and reprocessing of rubber vehicular tires into scrap for diverse useful purposes as rubber reclamation, fillers, and the like, thereby avoiding unsightly, burdensome and hazardous waste piles of worn tires. Such is primarily effected by chopping and comminution of the rubber tires into smaller pieces and particles. Vehicle tires of all types commonly include steel banding or woven wires of significant cross-sectional diameter in the rim beads which conventionally must be cut or chopped along with the rubber in the comminution and reclamation process. The same is true of any steel belting in the tire sidewalls and tread, but wherein such steel tread or sidewall plies are substantially thinner and web-like as contrasted to the cable-like steel rim beads.

The steel ply sidewall and tread scrap can be generally readily cut by heavy-duty comminuting equipment in chopping the tire, and such steel scrap can be readily separated from the shredded rubber by magnetic or other separation techniques, as is well known in the art.

While passenger vehicle tire beads wires are not of excessively large diameter and can be chopped in the reclaiming process, nonetheless the same contribute to quick wear and dulling of the cutters. The bead cutting problem, however, is far more pronounced with heavy duty and more massive tires, as are used on large trucks, earthmovers, and many other vehicles in heavy load service.

In such tires, the steel wire reinforcement in the annular beads on the outside and inside of the tires is of such size, hardness, and cable-like grouping that the cutting elements of the tire chopping and shredding equipment are quickly and severely damaged in processing such heavy duty tires, with resultant more frequent downtime and expense of equipment for cutter replacement or refurbishment.

This problem has been recognized in the art as shown by Burch U.S. Pat. No. 4,873,759 or Uemura U.S. Pat. No. 3,838,492, for example. In these patents, prior to comminution of the large tires, the steel beads are physically pulled from the tire by a mandrel or rod through a relatively large extruding aperture, the ripped beads thereafter being separately processed by suitable equipment. Accordingly, the tires, after being freed from the damage-causing beads may be comminuted or otherwise processed, and the beads separately processed to reclaim the metal.

It has been found, however, that despite bead puller or ripper equipment of the type illustrated by the Burch and Uemura patents, that the beads cannot be reasonably cleanly torn from the tires, whether passenger or heavy duty, but may jam and/or overload the pulling and tearing equipment. Further, in removing the metal beads, it is desired that only a minimum of rubber or other carcass material be pulled from the tire along with the bead, but with present designs in order to have an aperture of sufficient size for a bead-pulling rod, excess rubber is also pulled through the aperture, and indeed even an overly substantial portion of the carcass, thereby obviating the desired result of removing the bead from the tire with minimum carcass.

BRIEF SUMMARY OF THE INVENTION

The present invention constitutes a significant improvement on prior bead pulling equipment for long-lived, reliable service, and wherein shutdown or jamming of the pulling or ripping equipment or excess inclusion of tire carcass or rubber is minimized or eliminated.

To this end, the bead passage aperture comprises a narrow transverse slot to permit the bead to be pulled therethrough and wherein the pulling mandrel passes through short transverse vertically arranged slots, providing a cruciform configuration to the pulling aperture. Importantly, the pulling mandrel is dimensioned so as to substantially fill the vertical slot portion, thereby leaving only narrow lateral slot portions on either side thereof. Further, both to facilitate a minimum-sized opening and to permit easier bead tear with reduced power load on the draw rod, a curved lip or guide is provided on the tire side of the tear opening, whereby the bead is assisted in sliding into and being pulled through the narrow slot.

Additionally, to ensure firm and safe handling of the bead, clamping means are provided to cooperate with the mandrel whereby the bead which is under substantial tensile forces during the tear is precluded from accidental release from the mandrel with resultant hazard as well as lost effort and time. This is especially the case when one end of the bead pulls fully free from the tire while the other bead end is still under draw, whereby the bead wire in the absence of the clamp may whip wildly.

Such clamping means moves with the mandrel as the mandrel is drawn, thereby to keep the bead firmly held and prevent any possibility of slipping with respect to the mandrel.

Another aspect of the invention embraces the unique method of preparing tires and bead tear separation. To this end the tire is cut generally radially at each inner and outer bead, thereby to eliminate the closed loop configuration of the bead prior to pulling. While the bead may be pulled from the tire without such preseverance, the undesirable closed loop form thereof requires that the draw opening be of larger size to permit the closed loop to be pulled therethrough, and in which case excess rubber and carcass can and do accompany the bead, which is unwanted.

The invention also embraces the concept of rendering the slot adjustable in size to maintain a minimum size opening, thereby ensuring that a minimum of rubber or carcass accompanies the torn bead as it is torn from the tire and drawn through the aperture.

BRIEF DESCRIPTION OF THE DRAWINGS

The invention will be better understood in connection with the accompanying drawings, in which.

DETAILED DESCRIPTION OF A PREFERRED EMBODIMENT

Figure 1:
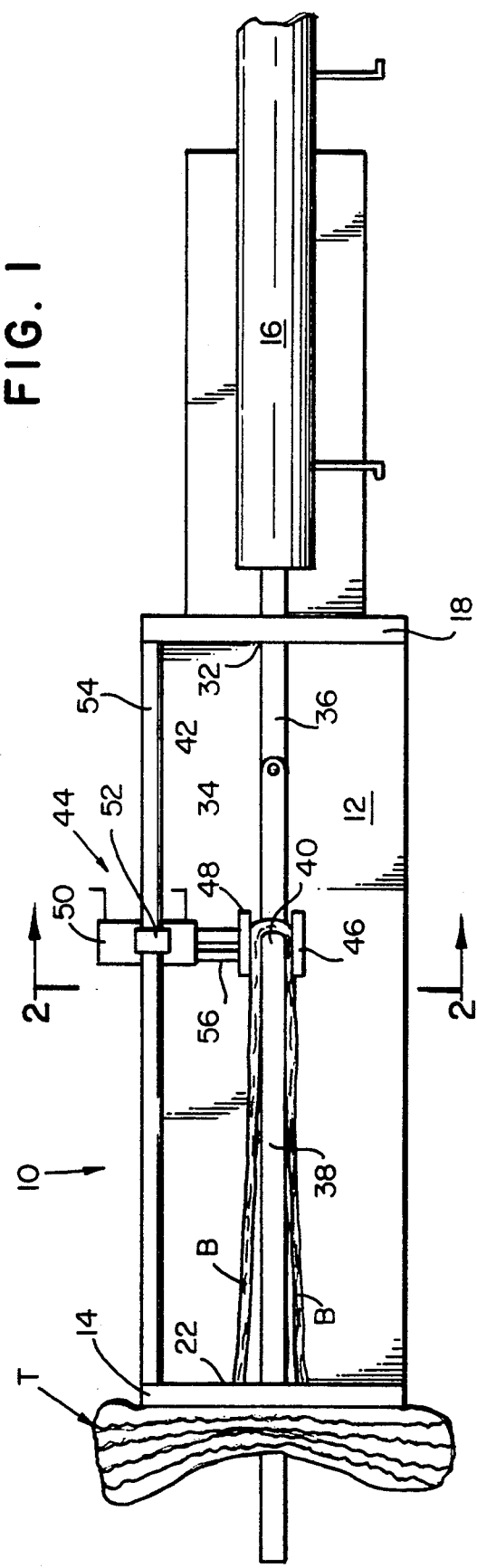
FIG. 1 is a general top plan view of the subject heavy duty tire bead puller, showing a bead in the process of being pulled from a tire.

Referring to the drawings, there is shown in FIG. 1 at 10 the apparatus of the invention viewed from the top and illustratively in use with a vehicle tire, as a passenger or heavy duty truck tire T to be reclaimed and from which the heavy and multiple wire beads B must be removed before the tire T can be further processed, as by chopping or other comminution technique.

The apparatus 10 includes a suitably rigid and strong base member 12 extending between the draw plate 14 at the tire T and a fluid draw cylinder 16 fixed thereto by bracket or like means well known in the art. Disposed between the cylinder 16 and the draw plate 14 is an upstanding mandrel guide plate 18.

The draw plate 14 constitutes a chief feature of the invention, and as seen in FIGS. 3–7 includes a heavy and rigid steel plate upstanding from and secured to the base 12. Plate 14 has a wide, generally cruciform opening 20 therein, including laterally extending slot portions 22 and a shorter, vertically oriented slot 24. Further, and also importantly, the front face or "tire-side" of plate 14 includes a transversely extending bar 26 which has a curved tire-side face 28. The bar 26 is positioned parallel to and immediately below horizontal slot 20, and the bar is centrally notched at 30 to conform to the lower portion 24 of cruciform slot 20, all for reasons to be noted hereinafter.

As shown, the bar is half-round stock, but could be of other forms having a curved rearwardly-facing surface as at 28, such as tube stock welded to plate 14.

An important feature of the invention and contributing materially to success thereof is the close fit between mandrel 34 and vertical portion 24 of slot 20, noted hereinafter.

Also carried by base 12 is the upstanding guide plate 18, and which has an aperture 32 therein generally conforming to mandrel 34 for slidably receiving the same.

Mandrel 34 is the chief operating element of the device and is of a generally known form including an elongated lower leg 36 and an upper hook leg 38 which terminates at a point along lower leg 36 in a bead hook 40. The mandrel at one end is connected as generally illustrated at 42 to draw means, as the piston rod of cylinder 16. The opposite end of mandrel 34 extends freely through the draw plate 14.

The length of the mandrel 34, the relationship thereto of the bead hook 40, and the stroke of cylinder 16 is such that at the start of a bead pulling operation, the mandrel is sufficiently extended back through draw plate 14 that hook 40 is positioned on the tire side of plate 14 by a distance adequate to engage the rearmost bead of a tire slipped over the mandrel, and while upon full draw of the cylinder, the mandrel must have moved sufficiently past the draw plate 14 for full tear-removal of a bead from the heavy duty tire, or a distance generally equal to or preferably substantially in excess of one-half of the bead circumference, thereby to insure that the bead is fully torn from the tire without requiring difficult added manipulation with a portion of the bead still connected to the tire.

Further, the cross-section of the mandrel lower leg 36 and upper leg 38 is such that the mandrel closely fills the vertical slot 24 in aperture plate 14. In so doing, once the hook end of the mandrel 34 passes through the slot, there only remains the two lateral slot portions 22, 22 on either side thereof through which the bead can be pulled.

Figure 2:
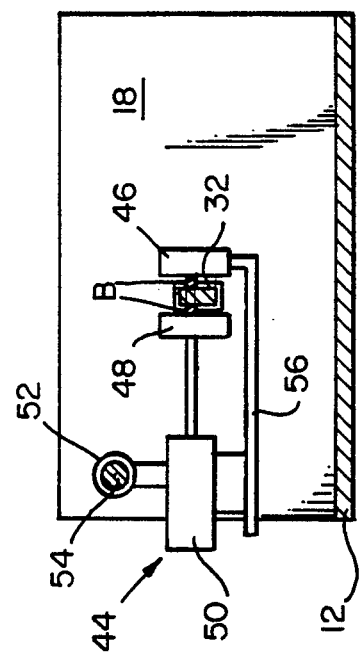
FIG. 2 is a sectional view taken on the line 2—2 of FIG. 1 showing the clamping mechanism in association with the puller mandrel.
Figure 3:
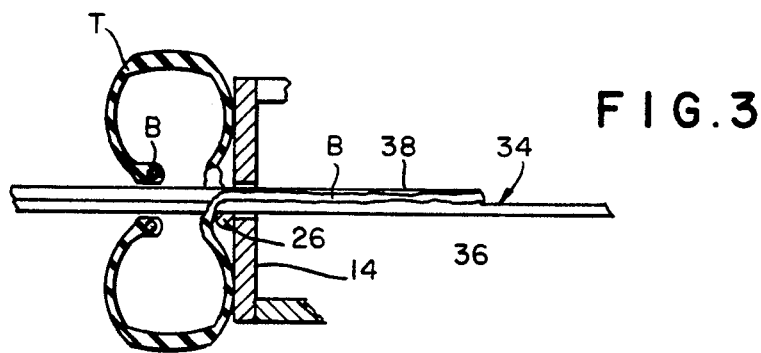
FIG. 3 is a fragmentary; diagrammatic view of bead removal, parts of the device being removed for clarity.
Figure 4:
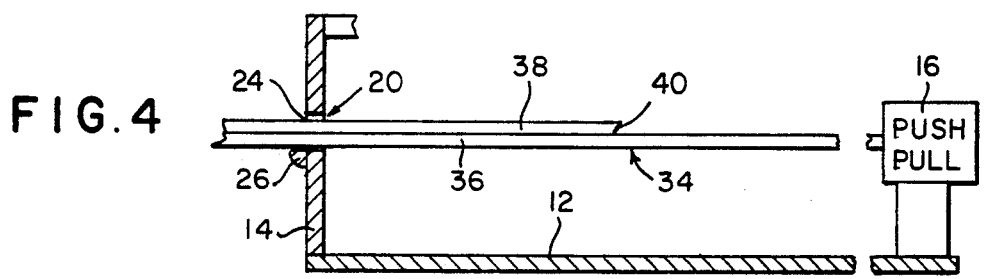
FIG. 4 is similar to FIG. 3, but with the tire absent.
Figure 5:
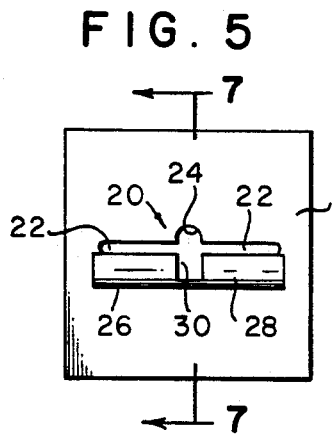
FIG. 5 is a front view of the apertured draw plate.
Figure 6:
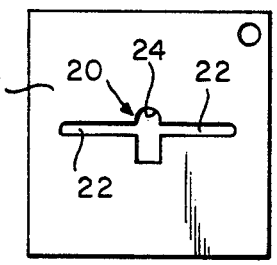
FIG. 6 is a rear view thereof from the pulling side.
Figure 7:
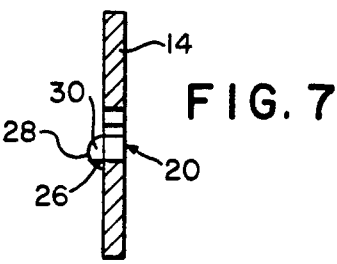
FIG. 7 is a sectional side elevation thereof taken on the line 7—7 of FIG. 5, and, FIG. 8 is a diagrammatic view showing a tire with preferred tire bead cuts prior to bead removal.

To ensure that the bead B remains on the mandrel hook 40 after the hook passes through draw plate 14, and to minimize personnel and other hazard from a loose or whipping tire bead, means are provided to clamp the hooked bead portion firmly to the mandrel. To this end, and as seen in FIGS. 1 and 2, clamp means 44 includes a fixed jaw 46 and a movable jaw 48 on opposite sides of the mandrel, Movable jaw 48 extends from fluid cylinder 50 which is mounted by bracket 52 for sliding movement on rod 54 extending parallel to the mandrel.

The fixed jaw 46 is connected as by a bracket 56 to the cylinder 50. Conventional means may be provided, as a slotted bracket, to adjust the position of the fixed jaw 46 with respect to the mandrel, and then fix the same in place with respect to the mandrel for cooperation with movable jaw 48.

The clamp means 44 is thereby mounted for sliding movement on rod 54, which latter is supported by and fixed to the plates 14, 18. Accordingly, the movable jaw 46 may be extended, thereby to clamp the bead B on either side of the hook and between the jaws. By virtue of the sliding mount of the cylinder, the clamp means can move longitudinally as a unit with the hook as the latter is drawn by cylinder 16.

Figure 8:
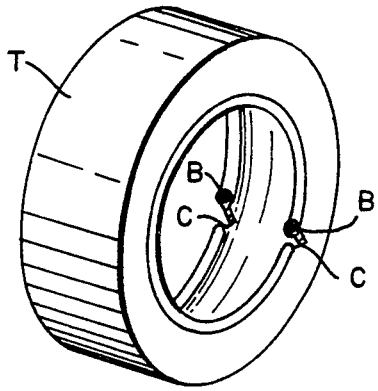

As a further feature of the invention and in cooperation with the disclosed apparatus, a tire T from which the bead is to be removed has each bead cut at one point, as at C, FIG. 8, as by heavy steel cutters. Thereafter, in use with the preferred embodiment disclosed, the tire T is positioned over the mandrel as generally seen in FIG. 1, with the cuts C desirably in a lower six o'clock position. In so positioning the tire, the hook 40 at that time will be further from draw plate 14 than the particular inner or outer bead to be pulled.

Thereupon, as mandrel 34 is drawn through plate 14, the hook 40 will engage the inner periphery of the tire at the heavy bead B at about the 12 o'clock position, and commence to tear the bead from the tire and pull the same through draw plate 14. As the pull continues, the bead will tear from the tire on either side of the hook area, and be drawn through the narrow gap lateral portions 22 of the lot 20, the remainder of the slot being fully occupied by the mandrel, as noted.

As soon as the hook 40 and a short length of bead on either side thereof have advanced through the plate 14, the clamp means is actuated by its fluid cylinder or other means to clamp the jaws 46, 48 against the torn bead and the area of the mandrel adjacent the hook. In this manner, there is no danger that the bead may suddenly slip from the hook in a hazardous manner. As the mandrel continues to move, the clamp means will slide along its rod or bar 54, as generally indicated in FIG. 1.

As only the lateral slot portions 22 are open, the bead on either side is constrained to be drawn therethrough, sliding over curved lip 28, whereby the narrow gap permits the bead and only a minimum of adjacent rubber or carcass to fit therethrough, whereby the bead is torn relatively cleanly from the tire.

After a sufficient length is drawn, the bead at both ends of the cut C will tear fully free from the tire, and the torn bead is then released from the mandrel for further handling. In this regard, in practical terms, one side of the cut bead is likely to pull free from the tire before the other bead length, and pass freely through the draw plate. In the absence of clamp means as disclosed, the tensile stress on the bead would permit the same to whip laterally and slide around the hook as the other bead remained attached to the tire.

In like manner, should the beads separate generally simultaneously from the tire, both would tend to fly through the slot in the nature of a slingshot. This danger of hazard is precluded by the clamp means, and permits faster, stronger pull on the bead to expedite the reclaiming operation as compared with other equipment.

After full removal of one tire bead, the operation is then repeated for the second bead of the tire.

It is important as noted that minimum rubber or carcass be removed with the bead to facilitate, inter alia, reprocessing of the metal bead wire, as well as to facilitate the handling thereof. To this end, as noted, the slot 20 is of minimum dimensions to accommodate the bead. As the resistance forces are quite substantial by virtue of the mass of the bead, the character of the tire carcass about the bead, and the intimate bonding between the bead and the remainder of the tire at the inner periphery, it is imperative to minimize mechanical resistance forces of the equipment, while still effecting pultrusion of minimum rubber or tire carcass through the draw plate 14.

This is achieved by the unique cooperation of the aforesaid minimum area lateral slotted opening 22 coupled with the curved guide surface 28 thereat. The curved lip 28 on the lower side of the slot does not interfere with the hook engagement with the bead, and as the draw progresses, permits the bead wire to make a smooth transition into the slot 20. The provision of this member has been found in practice to make a substantial contribution to the reliability and effectiveness of the tear. Further, as indicated, the only available passage for tire and bead material are the narrow slot portions 22, as the vertical slot portion 24 is fully occupied by mandrel 34, thereby precluding any passage of carcass therethrough.

In lieu of a fixed draw slot 20, in a modification of the invention, draw plate 14 may be provided with means as sliding shoes on the front of the plate at either end of slot portion 22 which may be moved inwardly as by fluid cylinder means to close down the lateral extent of slot portion 22 as the draw progresses or as desired for a particular tire, thereby to minimize even further the opening and any extraneous carcass material drawn therethrough. Such sliding shoes would lie on the plate above and below the lateral slot, the curved guide being relieved slightly adjacent the plate to receive the shoes.

While I have set forth one and a preferred form of my invention, it is evident that the objects and advantages thereof may be achieved with differing arrangements of the invention as defined in the appended claims.

What I claim is:

1. A heavy duty bead puller for tires comprising:
   a draw plate having an aperture in the form of an elongated narrow transverse slot,
   a curved lead-in guide adjacent said plate on one side of said slot, said guide including a curved surface extending outwardly and away from said slot,
   an elongated mandrel mounted for extension through said slot and having a hook thereon for engagement and reception of a tire bead on said one side of said draw plate,
   means for pulling the mandrel through said draw plate aperture, thereby to tear a bead from a tire and pull the bead through the slot to the other side of said draw plate and free from said tire, and,
   means for clamping a portion of a bead to said mandrel to preclude separation of the bead from said mandrel as the bead is pulled through the said slot.

2. The bead puller of claim 1 wherein said aperture includes a pair of short upper and lower vertical slot portions disposed at right angles to said transverse slot on either side thereof, thereby to define a generally cruciform aperture.

3. The bead puller of claim 2 wherein said mandrel closely fits within the vertical slotted portion of said draw plate aperture, thereby to substantially fully occupy the same, whereby the tire bead is constrained to pass through only lateral portions of said transverse slot.

4. The apparatus of claim 3 wherein said mandrel has a minimum length extending from said hook on said one side of said draw plate at least equal to one-half of the circumference of a bead to be torn from a tire, thereby to insure that the bead will be fully pulled through the draw plate while the mandrel is still in the slot thereof.

5. The bead puller of claim 2 wherein said curved guide lies on both sides of said lower slot portion adjacent the bottom of said transverse slot so as to not obstruct said lower slot portion.

6. The bead puller of claim 1 including means mounting said clamp means for longitudinal movement with said mandrel.

7. The bead puller of claim 6 wherein said mounting means include an elongated bar disposed parallel to said mandrel, and said clamp means includes a slidable connection with said bar.

8. The bead puller of claim 7 wherein said bar of said mounting means extends between said draw plate and said guide plate and is fixed thereto.

9. The bead puller of claim 6 wherein said clamp means includes a pair of jaws disposed on either side of said mandrel, and means for relatively moving said jaws to clamp the bead against the said mandrel.

10. The bead puller of claim 1 further including a guide plate disposed in longitudinally spaced relation to said draw plate, said guide plate having an aperture through which said mandrel extends, thereby to cooperate with said draw plate in supporting and guiding said mandrel.

11. The bead puller of claim 1 further including means for varying the width of said slot.

12. A method of removing a bead from a heavy duty tire comprising the steps of:
   hooking a tire bead onto an elongated mandrel,
   drawing the mandrel and hooked tire bead thereon through a narrow slot-like aperture from one side thereof, said aperture being of sufficient size to pass the tire bead but insufficient to permit any substantial portion of the tire from passing therethrough,
   guiding the bead as it is torn from the tire and pulled through the aperture over a curved surface adjacent the aperture on said one side thereof and curved outwardly therefrom, thereby to smooth the passage of the bead through the aperture,
   continuing the drawing step until the bead is fully torn from the remainder of the tire, and holding substantially the entire tire other than the bead on said one side of the aperture as the bead is fully pulled through the aperture.

13. The method of claim 12 further including the step of clamping an initially torn portion of said bead to the mandrel.

14. The method of claim 12 including the step of severing the tire bead at a predetermined point on the tire prior to said drawing step.

15. The method of claim 14 wherein the tire bead hooking step occurs at a point on said bead substantially arcuately spaced from the point of severance of the bead.

16. The method of claim 14 wherein the tire bead is hooked at a point arcuately spaced about 180° from the point of severance of the bead.

17. The method of claim 12 including the step of limiting the draw aperture to a pair of spaced narrow slot portions adjacent the mandrel during the step of drawing the bead therethrough.

18. The method of claim 17 wherein said mandrel having a minimum length from the location of hooking the tire bead thereon to the end thereof on the same side of the aperture as the tire at least equal to one-half of the circumference of a bead to be torn from a tire, thereby to insure that the bead will be fully pulled through the aperture while the mandrel is still in the aperture.

* * * * *